United States Patent
Henry et al.

(10) Patent No.: US 10,893,189 B2
(45) Date of Patent: Jan. 12, 2021

(54) PHOTOGRAPHY ACCESSORY FOR A PORTABLE ELECTRONIC DEVICE

(71) Applicant: The Runningman (UK) Limited, Leicestershire (GB)

(72) Inventors: Sean Henry, Warwickshire (GB); Bruce Renfrew, Leicester (GB); Shaun Phillips, Leicester (GB)

(73) Assignee: The Runningman (UK) Limited, Leicestershire (GB)

( * ) Notice: Subject to any disclaimer, the term of this patent is extended or adjusted under 35 U.S.C. 154(b) by 0 days.

(21) Appl. No.: 16/079,292

(22) PCT Filed: Feb. 27, 2017

(86) PCT No.: PCT/GB2017/050526
§ 371 (c)(1),
(2) Date: Aug. 23, 2018

(87) PCT Pub. No.: WO2017/144921
PCT Pub. Date: Aug. 31, 2017

(65) Prior Publication Data
US 2019/0075235 A1    Mar. 7, 2019

(30) Foreign Application Priority Data
Feb. 26, 2016 (GB) .................................. 1603379.7

(51) Int. Cl.
*H04N 5/232* (2006.01)
*H04N 5/225* (2006.01)
(Continued)

(52) U.S. Cl.
CPC ....... *H04N 5/23216* (2013.01); *H04B 1/3888* (2013.01); *H04M 1/0264* (2013.01);
(Continued)

(58) Field of Classification Search
CPC ......... H04N 5/23216; H04N 5/232933; H04N 5/2252; H04M 1/72527; H04M 1/0264;
(Continued)

(56) References Cited

U.S. PATENT DOCUMENTS 8,825,124 B1 * 9/2014 Davies ................. H04M 1/185
455/575.8
2012/0270599 A1 * 10/2012 Mori ................... H04M 1/0254
455/556.1
(Continued)

FOREIGN PATENT DOCUMENTS

| CN | 203951523 U | 11/2014 |
| CN | 204669421 U | 9/2015 |
| EP | 2613448 | 7/2013 |

OTHER PUBLICATIONS

McEllroy, Kelly "Incipio® Unveils Focal™ Camera Case for iPhone 5/5s at 2014 International CES" Jan. 15, 2014 http://blog.incipio.com/news/incipio-press-releases/focal-camera-case.html.
(Continued)

*Primary Examiner* — Lin Ye
*Assistant Examiner* — John H Morehead, III
(74) *Attorney, Agent, or Firm* — Bond, Schoeneck & King, PLLC; Joseph Noto (57) ABSTRACT

There is disclosed a photography housing (10) for a portable electronic device (56) having an image sensor (58). The housing has first (12) and second (14) housing components defining at least a partial enclosure for receiving a portable electronic device, the first and second housing components being movably connected to one another, such that an internal dimension of the at least partial enclosure can be altered to releasably fit a dimension of the portable electronic device (56) inserted therein. The housing (10) comprises a user input device (22, 24, 26, 28) for controlling the operation of the image sensor (58) during use of the photography housing. The housing may provide a professional photography housing for a mobile telephone, e.g. providing ergonomic shutter control and photographic function selection via wireless communication with the mobile telephone.

17 Claims, 3 Drawing Sheets

(51) Int. Cl.
    *H04M 1/725*       (2006.01)
    *H04B 1/3888*     (2015.01)
    *H04M 1/18*        (2006.01)
    *H04M 1/02*        (2006.01)
    *H04M 1/215*      (2006.01)

(52) U.S. Cl.
    CPC ........... *H04M 1/185* (2013.01); *H04M 1/215* (2013.01); *H04M 1/72527* (2013.01); *H04N 5/2252* (2013.01); *H04N 5/232933* (2018.08); *H04M 2250/52* (2013.01)

(58) Field of Classification Search
    CPC .. H04M 1/185; H04M 1/215; H04M 2250/52; H04B 1/3888
    See application file for complete search history.

(56) References Cited

U.S. PATENT DOCUMENTS

| | | | | |
|---|---|---|---|---|
| 2012/0282977 A1* | 11/2012 | Haleluk | .............. | H04M 1/0202 455/556.1 |
| 2013/0206614 A1* | 8/2013 | O'Neill | .............. | H04M 1/0264 206/216 |
| 2013/0271902 A1* | 10/2013 | Lai | ........................... | H05K 5/06 361/679.01 |
| 2014/0104491 A1* | 4/2014 | Liu | ....................... | G03B 17/38 348/376 |
| 2014/0226268 A1 | 8/2014 | O'Neill et al. | | |
| 2014/0247246 A1* | 9/2014 | Maus | ................... | G06F 1/1632 345/174 |
| 2015/0156297 A1* | 6/2015 | Crawford | ................ | H02J 50/10 455/26.1 |
| 2015/0180527 A1* | 6/2015 | Fathollahi | ............ | H04M 1/185 455/575.8 |
| 2016/0234356 A1* | 8/2016 | Thomas | ............... | H05K 9/0069 |
| 2017/0223242 A1* | 8/2017 | Barros | ................ | G03B 17/565 |

OTHER PUBLICATIONS

"Red Pop", Kickstarter.com https://www.kickstarter.com/projects/haltek/red-pop.
UKIPO Search Report dated Dec. 7, 2016; Application GB1603379.7; 6 pages.
International Search Report and Written Opinion dated Jul. 25, 2017; PCT Application PCT/GB2017/050526; Forms PCT/ISA/210 and ISA/237; 19 pages.
Chinese Office Action for Application No. CN201780025530A, dated Mar. 18, 2020.

* cited by examiner

PHOTOGRAPHY ACCESSORY FOR A PORTABLE ELECTRONIC DEVICE

This application is a United States National Phase from International Patent Application No. PCT/GB2017/050526 filed Feb. 27, 2017, which claimed benefit of Great Britain Application No. 1603379.7 filed Feb. 26, 2016, each of the subject matters of which are incorporated herein by reference in their entireties.

The present invention relates to an accessory for a portable electronic device to improve the device's use for photography, and more particularly, although not exclusively, to an accessory for a mobile phone.

Cases are commonly used to protect portable electronic devices, in particular mobile phones, from damage during use. For example, cases are typically used to prevent damage incurred when a portable electronic device is dropped by a user. To provide such protection cases are commonly made from a relatively rigid material which encases the portable electronic device, without obscuring the screen of the device. However, such cases are bespoke to a particular portable electronic device, such that particular cases are only compatible with particular portable electronic devices.

Cases have also been proposed which interact with portable electronic devices to provide increased functionality or ease of use, for example cases which act as a videogame controller or the like. Again, however, cases that require a physical electrical connection are bespoke to a particular portable electronic device, such that particular cases are only compatible with particular portable electronic devices. In the example of wireless videogame controllers, which provide for user command inputs via buttons on the controller, instead of using the existing touch screen interface of the mobile phone, communication between the controller and the mobile phone is typically implemented using Bluetooth® wireless signals.

Improvements in camera technology in mobile phones over recent years has replaced the need for a portable camera for many users. However mobile phones are designed to be suitable for a wide variety of functions, and, as such, the camera functionality of mobile phones is not optimised to the extent that it would detract from the general-purpose use of the phone.

There have been disclosed in the art, lens accessories for mobile phones which are arranged to clip over the camera lens provided in the phone housing. Such lenses can thus increase the adaptability of the mobile phone for specific photographic requirements. However the control of the camera is limited to the functionality provided by the mobile phones on-screen user interface. Furthermore such lenses are typically awkward to apply and detract from the ergonomics of the mobile phone itself.

There has now been devised a photographic accessory for a portable electronic device which overcomes or substantially mitigates the aforementioned and/or other disadvantages associated with the prior art.

According to a first aspect of the present invention there is provided a housing for a portable electronic device having an image sensor, the housing comprising first and second housing components defining at least a partial enclosure for receiving a portable electronic device, the first and second housing components being movably connected to one another, such that an internal dimension of the at least a partial enclosure can be altered to fit a dimension of the portable electronic device inserted therein, wherein the housing comprises a user input device for controlling the operation of the image sensor.

The internal volume of the at least a partial enclosure can be altered to adapt the housing to fit portable electronic devices of varying sizes, thus removing the need for a bespoke housing for each portable electronic device, and providing a housing with wide or universal device compatibility.

The housing may be used with any suitable portable electronic device, for example a mobile phone or a tablet or the like.

Movement of the first and second housing components toward or away from one another may respectively decrease or increase the internal volume of the at least partial enclosure.

The first and second housing components may be adjusted to grip or closely fit the portable electronic device therein in use. The housing may grip or closely fit opposing lateral edges of the device, e.g. opposing longitudinal edges thereof.

The first and/or second housing portions may be biased. Either of first and second housing portions may be biased towards the other housing portion, e.g. towards a closed condition or towards a minimal internal volume condition of the at least partial enclosure. The housing may comprise a spring to provide the biasing force. The biasing mechanism may be used with or without a latch for holding the first and second housings in a selected relative position, e.g. when closed onto a portable electronic device there-between.

The first and second housing components may define at least a partial enclosure for receiving a portable electronic device such that at least a portion of the portable electronic device, for example a portion of a portable electronic device comprising the image sensor, extends outwardly from the at least partial enclosure in use. This may be beneficial as the housing may be fitted to portable electronic devices of varying sizes without inhibiting the normal functions of the portable electronic device, for example the ability to take a photograph using the portable electronic device.

The first and/or second housing component may be shaped so as to expose the image sensor of the portable electronic device. The housing and/or partial enclosure may be of a length dimension that is shorter than the length of the portable electronic device such that at least an end portion of portable electronic device protrudes from the enclosure when mounted therein. The length dimension of the housing and/or partial enclosure may be greater than one third or one half of the portable electronic device, e.g. thereby enclosing a majority of the length of the device.

The at least a partial enclosure may be substantially rectangular in form, with one open end. This may be beneficial as a portable electronic device may be slid into the housing via the open end of the at least a partial enclosure. The first and second housing components may define a substantially rectangular partial enclosure which is open at one end.

At most three sides of a portable electronic device may be received within the at least partial enclosure, in use. A screen of a portable electronic device may be accessible to a user when a portable electronic device is received within the at least partial enclosure, in use.

At least one image sensor and/or camera lens of a portable electronic device may extend outwardly from the at least a partial enclosure, in use.

The portable electronic device and/or housing may have a length and a lateral/width dimension. The first and second housing components may be selectively adjustable in the lateral direction.

The first and second housing components may comprise cooperating formations which enable relative movement between the first and second housing components. The first and second housing components may be slidably connected to one another. The first and second housing components may comprise cooperating formations which enable sliding movement between the first and second housing components, for example corresponding track formations or a projection received within an elongate recess, or the like.

At least a portion of the first housing component may be receivable within the second housing component, or vice versa. The first housing component may comprise a channel for receiving at least a portion of the second housing component, or vice versa.

The minimum internal dimension of the housing enclosure may correspond substantially to the internal width/length of the larger of the first and second housing components. The smaller component may fit within the profile of the larger.

The relative positions of the first and second housing components may be selectively fixable/releasable, such that a portable electronic device may be held between the first and second housing components. The case may comprise a fixing/fastening formation for releasably fixing the relative positions of the first and second housing components.

The first and second housing components may comprise opposing parallel walls. A portable electronic device may be held between the opposing parallel walls, in use.

Either or both of the first and second housing components may comprise a retaining formation for retaining a portable electronic device within the at least a partial enclosure. Opposing retaining formations may be provided. The retaining formations may be located on the opposing parallel walls.

The, or each retaining formation, may comprise a channel, lip or tab on the corresponding housing component. Opposingly facing retaining formations may be provided on the first and second housing components, for example formed on the opposing parallel walls. The, or each, retaining formation may be provided on a rear surface of the housing. Opposing retaining formations may be spaced so as to define an open rear surface of the partial enclosure.

The partial enclosure may have a depth dimension for accommodating the thickness of the portable electronic device. The depth dimension may be defined between a frontal wall of the partial enclosure and the, or each, retaining formation.

The housing may comprise a grip portion, for example a portion which facilitates grasping of the housing by a user. The grip portion may have a greater depth dimension than a remainder of the housing. The grip portion may be located towards an end of the housing.

The first and/or second housing components may be shaped to define the grip portion. The first and second housing components may each define at least a portion of the grip portion. The grip portion may be shaped to receive at least one of a user's digits, in use, and may, for example, be shaped to receive all four of a user's fingers in use. An outer surface of the grip portion may be curved, contoured and/or bulbous in form, for example such that a user's digits may be wrapped around the grip portion, in use.

The grip portion may protrude forwardly of the partial enclosure, e.g. in a direction in which the image sensor faces for capturing images in use. The grip portion may be formed on, and/or project outwardly from, a surface of the housing that faces away from a user, in use. The grip portion may extend part-way along the length dimension of the housing and/or partial enclosure.

The housing may comprise at least one transmitter/emitter and/or at least one receiver for communication with a portable electronic device. The housing may comprise a further internal enclosure for electronic components/circuitry thereof. The further enclosure may be located in the grip portion. The further enclosure may be fully enclosed, e.g. at least in use.

The user input device comprise at least one manual actuator for activating or controlling one or more photography function of the portable electronic device, and/or for altering photographic settings of a portable electronic device, in use. The, or each manual actuator may control a dedicated variable of a photography/videography software application running on the portable electronic device, and/or for altering software application settings of the portable electronic device, in use. The at least one manual actuator may be configured to activate functions and/or alter settings of a camera application of a portable electronic device, in use.

The user input device comprise at least one manual actuator for controlling operation of the image sensor and/or an associated light source. The one or more manual actuator may control any or any combination of: image capture (e.g. triggering of instantaneous image capture); exposure duration; exposure timing/delay; focus; image capture resolution.

The at least one manual actuator may be configured to alter any or any combination of the following settings of a photography software application of a portable electronic device: white balance; zoom; light sensitivity of the image sensor (i.e. ISO); duration of image capture (i.e. akin to shutter speed); mode and/or function selection; manual focus; low light indicator; bracketing; exposure compensation; timer; time lapse; high definition resolution (HDR); reset; flash; low light; location; facial recognition.

The at least one manual actuator may be configured to switch between modes, for example between collections of image capture settings, e.g. of a photography software application, of the portable electronic device.

The at least one manual actuator may provide tactile feedback to a user, and/or comprise visual indicia for, indicating a change in settings to a user. Dial settings may be provided on the/each manual actuator.

The at least one manual actuator may be configured to trigger image capture, e.g. take a photograph or commence video recording, using the image sensor when the at least one manual actuator is depressed, for example fully depressed. The at least one manual actuator may be configured to alter the focus settings for image capture when the at least one manual actuator is partially depressed.

The function of the at least one manual actuator may be user configurable, for example using a software application of the portable electronic device. A user may assign one or more photographic function to the at least one manual actuator, which function may correspond to a photographic variable controlled via the photography software application on the portable electronic device.

Actuation of the user input device, or a manual actuator thereof, may cause/trigger wireless signal transmission and/or communication with the portable electronic device held in the housing, in use.

The housing may comprise a signal transmitter/transducer, such as an acoustic and/or radio signal transmitter. The portable electronic device may comprise a corresponding receiver/transducer, such as an acoustic (microphone) and/or radio receiver. A frequency range of 10 kHz to 30 kHz may be used for communication of an acoustic signal The housing may communicate with a portable electronic device using acoustic signal emission in the far audible, near ultrasonic and/or ultrasonic spectrum. The housing may communicate with a portable electronic device using frequencies of greater than 15 or 17 kHz, e.g. between 17 kHz and 25 kHz. The housing may communicate with a portable electronic device using frequencies of between 18 kHz and 20 kHz. The housing may communicate with a portable electronic device using frequencies of around 19 kHz.

The housing may communicate with a portable electronic device via radio signals such as Bluetooth or near field communication (NFC).

The housing may hold a portable electronic device such that there is no physical electronic connection between the housing and a portable electronic device.

The at least one manual actuator may comprise a wheel turnable by a user, and/or a button depressible by a user. The housing may comprise a plurality of manual actuators, each of which may be configured to perform a different function. The housing may comprise a plurality of different types of manual actuator.

The housing may comprise a mount for removably mounting ancillary components to the photography accessory, for example one or more of an ancillary camera, lighting and/or support components. The housing may comprise a mount for mounting at least one lens and/or flash bulb to the housing. The mount may comprise a mechanical connector. The mount may comprise an electrical connector. The mount may comprise a hot shoe mount.

The housing may comprise a mount for attachment to a support having one or more arm or leg, e.g. a tripod or fixed/adjustable arm, for supporting the housing in a stable orientation for image capture.

The housing may comprise a connector for a cord or lanyard, such as a wrist strap, neck strap or the like. In the example in which the housing comprises a partial enclosure having an open end, the connector may be provided in the vicinity of, or at, the open end of the enclosure/housing. This helps to ensure the device does not fall from the open end when being worn or carried by a lanyard.

The housing may be defined as a removable casing for the portable electronic device. However it is to be noted that the present invention differs from typical phone cases in that the housing is not intended to provide a protective casing but rather a bespoke photography accessory to supplement the photography functionality of the mobile phone in an ergonomic manner.

The portable electronic device typically comprises its own casing or cover, e.g. providing an enclosure for its own internal electronics, which may comprise a protective shell of the device itself or a removable protective casing applied thereto.

The portable electronic device may comprise a lens positioned relative to the image capture sensor, e.g. a first and/or permanent lens. The housing may comprise a mount for a further lens arranged to selectively overlie the first lens. The housing may comprise a mount for a plurality of further lenses which may be selectively interchanged to overlie the first lens. The, or each, further lens may be pivotably mounted such that it can be selectively pivoted into and out of the field of view of the image sensor by a user.

According to a second aspect of the present invention there is provided a photography accessory for a portable electronic device, the portable electronic device having an image sensor and a controller for controlling one or more image capture parameter, wherein the accessory comprises a manual actuator and an acoustic signal transmitter arranged to output an acoustic signal for control of said one or more image capture parameter by the controller in response to user actuation of the manual actuator.

The acoustic signals may be in the far audible, supersonic, ultrasonic and/or near ultrasonic/supersonic spectrum. The acoustic signals may have a frequency of greater than 10, 15, 16 or 17 kHz. Each signal may comprise a plurality of tones, e.g. in sequence. The portable electronic device may recognise the plurality of tones as an instruction, e.g. rather than a single tone.

The photography accessory may comprise a removable casing for the portable electronic device. The photography accessory may be configured to at least partially enclose the portable electronic device in use.

The accessory may communicate with a portable electronic device using frequencies of between 17 kHz and 25 kHz. The accessory may communicate with a portable electronic device using frequencies of between 18 kHz and 20 kHz. The accessory may communicate with a portable electronic device using frequencies of around 19 kHz.

This may allow the accessory to communicate with a portable electronic device via a microphone of the portable electronic device, in use.

The accessory may comprise a plurality of manual actuators. Each manual actuator may trigger output of an acoustic output signal at a different frequency, or within a different range/band of frequencies. The acoustic output frequency value or range of each manual actuator may be spaced from that of each further actuator by a predetermined value. The predetermined spacing may be greater than 0.1 kHz, 0.15 kHz or 0.2 kHz. The predetermined spacing may be less than 1 kHz, such as less than 0.5, 0.4 or 0.3 kHz.

The, or each, manual actuator may be actuable in a plurality of ways/modes, for example in a plurality of directions and/or to a plurality of different levels, degrees or amounts of actuation. Each different actuation of an actuator may trigger output of a different frequency of acoustic signal by the transmitter. Each frequency may be spaced from another frequency for that actuator by a predetermined amount. The predetermined spacings may be as defined above. Each frequency for a single actuator may be contained within a predetermined frequency band or range for the actuator.

The, or each, actuator may have three or more modes of actuation. At least one actuator may comprise a pivotable/rotatable member, such as a wheel. At least one actuator may comprise a button, e.g. which may be depressed by varying amounts. At least one actuator may comprise a wheel, which is also depressible in the manner of a button.

According to a third aspect of the invention, there is provided a photographic equipment system comprising: a portable electronic device having an image sensor, a control signal receiver, a data store and a controller; and an accessory having one or more manual actuator and an output circuit arranged to output a control signal to said receiver for controlling operation of image capture by the image sensor; wherein the data store comprises machine readable instructions for operation of the controller to implement a plurality of image capture control parameters and the manual actuator is selectively assignable one or more of said plurality of image capture control parameters by an end user.

The controller run a software application from the data store and a user interface may allow mapping of one or more actuation mode of the manual actuator to one or more image capture control parameter. The user interface may be provided on a screen of the portable electronic device, such as a touch screen interface.

In this manner one or a plurality of manual actuators may be assignable to different individual photographic functions/parameters or else to a plurality or set of parameters, e.g. defining a photographic mode of operation. One or more manual actuator may allow selection of a current mode of camera operation, such as portrait, landscape, sport/action, night time, or the like.

According to a further aspect of the invention, there is provided a data carrier comprising machine readable instructions for operation of a controller of the portable electronic device to receive the control signal output of the accessory/housing and to control image capture by the image sensor of the portable electronic device. to the machine readable instructions may or may not allow mapping of manual actuator inputs from the accessory to photographic control parameters of the portable electronic device. In some examples, the machine readable instructions may allow user customisation of which functions are operable via one or more manual actuator and which functions are operable via a user interface (e.g. touch screen) of the portable electronic device.

Any one or more optional feature defined herein in relation to any one of the above aspects of the present invention may be applied to other aspects of the present invention, either individually or collectively, where appropriate. Any references herein to image capture or photography are intended to encompass any or any combination of still/individual image capture, capture of a plurality of still images, and/or video capture or videography.

Practicable embodiments of the invention will now be described, with reference to the accompanying drawings, of which.

The present invention is intended to operate in conjunction with a conventional portable electronic device, such as a mobile phone, tablet computer, pocket computer, personal digital assistant or the like, provided such device has an image capture sensor and the associated electronics allowing operation of the device as a portable camera. The details of such devices are well known to the skilled person and will not be described in detail herein for brevity. However such devices typically comprise a data store, one or more processors and a user interface. The user interface typically comprises a display screen and user input device, which may comprise a touch sensitive display screen and/or physical/mechanical keys or buttons. The device typically runs an operating system and allows user installation of software applications, or 'apps', for control of various aspects of the devices functionality. The device operating system/firmware typically comprises application programming interfaces (API's) allowing control of various hardware control parameters via apps. In this example, API's are provided to allow certain user-installed app control of the device's camera and flash.

Figure 1:
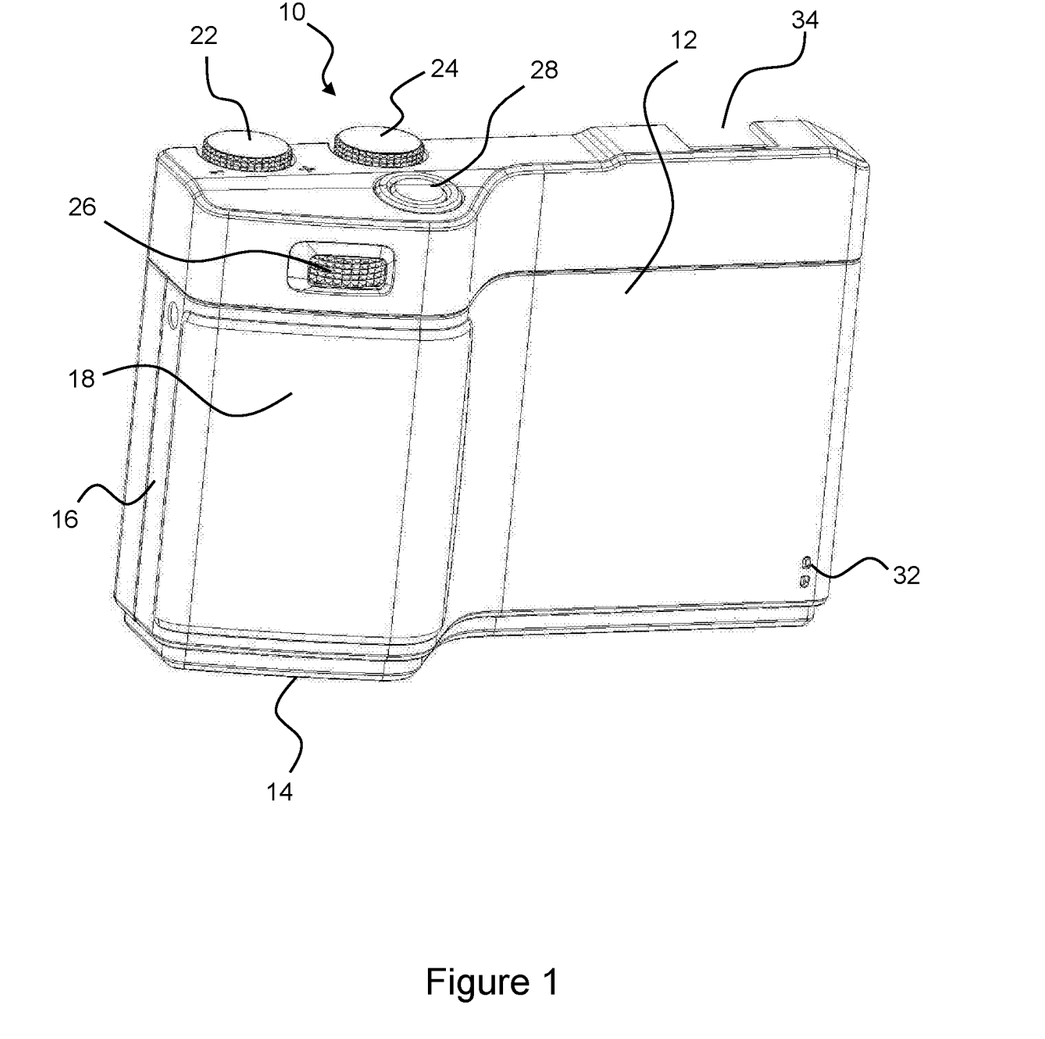
FIG. 1 is a schematic front perspective view of a removable housing according to the present invention.
Figure 2:
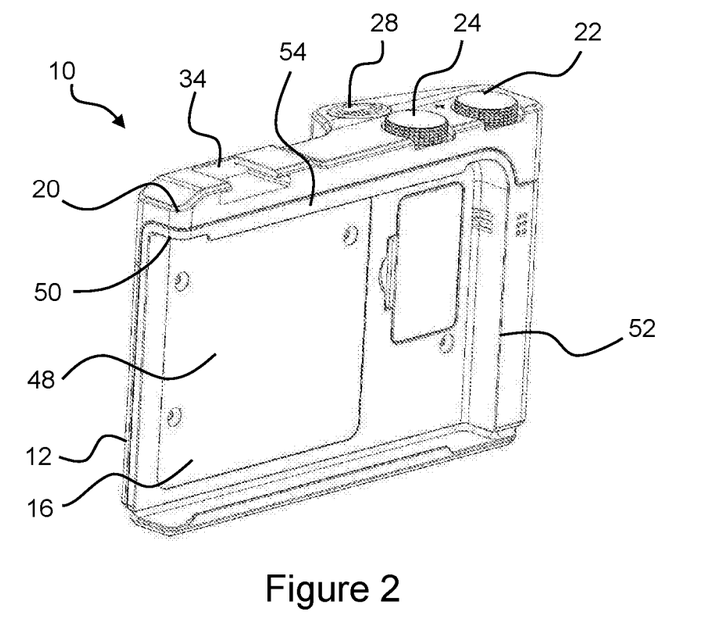
FIG. 2 is a schematic rear perspective view of the housing of FIG. 1.
Figure 3:
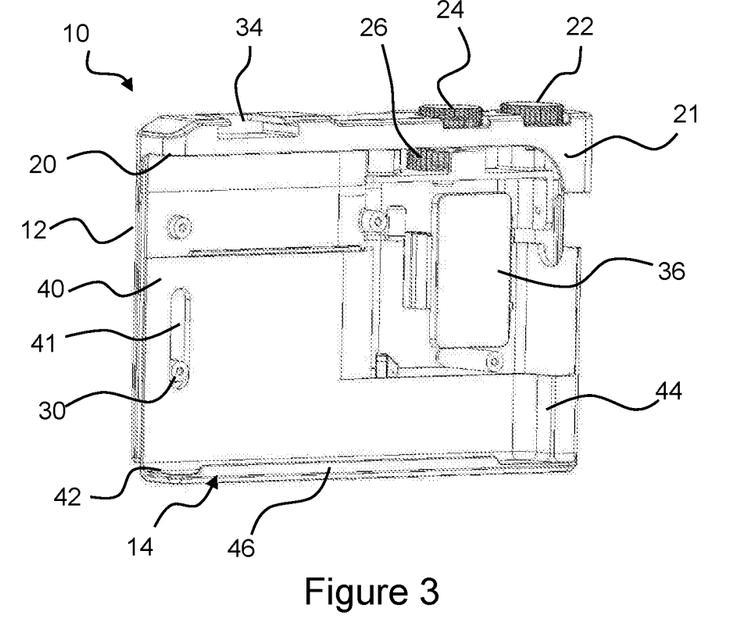
FIG. 3 is a schematic rear perspective view of the housing of FIG. 1, with a rear housing portion of the case removed.

A photography accessory or device, generally designated 10, according to the present invention is shown schematically in FIGS. 1 to 3.

The accessory 10 comprises first 12, second 14 and third 16 housing components. The first 12 and third 16 components in some embodiment may be combined or presented together as a singular construction/assembly.

The first housing component 12 is generally rectangular in form when viewed from the direction of a major front or rear face thereof. A front of the accessory 10 is defined in the direction facing away from a user in use of the device as a camera, i.e. in a direction towards the scene to be photographed. The rear of the accessory thus typically faces the user when holding the accessory in the manner of a camera. Lateral, left and right, sides and upper and lower faces of the accessory 10 can be defined accordingly such that the accessory defines a three dimensional body.

A front surface of the first housing component 12 is shaped to define a grip portion 18 which protrudes generally outwardly/forwardly from the first housing component 12. The grip portion 18 comprises a frontal surface, e.g. which may be generally planar, curved or contoured in form, and has curved lateral edges, such that the grip portion 18 can by grasped by a user's digits in use. The first housing component 12 thus defines a grip portion which is of greater depth than a remainder of the housing so as to sit comfortably in the hand of a user.

A grip of this kind allows the accessory 10 to be held in one hand, whilst also allowing actuation of user controls using one or a plurality of digits.

The first housing component 12 has a rearwardly facing ledge 20 towards the upper surface of the accessory 10.

The user control input means comprise manual actuators, which in this example comprise first 22, second 24, and third 26 wheels, and a depressible button 28. The first and second wheels 22 and 24 are mounted on the top surface of the housing, towards the rear. The third wheel 26 is mounted towards the front surface in the upper vicinity of, or above, the grip 18. The third wheel is seated below the uppermost surface of the housing. In other examples, one or more of the wheels could be replaced by sliders.

The first housing portion 12 further comprises a location formation 30, a strap receiving formation 32, a mount receiving formation in the form of recess 34, and an electronics housing 36. The electronic components of the device 10, e.g. comprising a controller, a transmitted/emitter, a power source and associated circuitry are mounted in the electronics housing cavity 36 within the interior of the grip portion 18.

The rearwardly facing ledge 20 extends substantially orthogonally relative to the remainder of the first housing component 12, in an upper region of the first housing component 12. A portion of the rearwardly facing ledge 20 extends downwardly to form an enclosed corner 21. The first 22 and second 24 wheels are mounted in recesses formed in an upper surface of the rearwardly facing ledge 20, such that the first 22 and second 24 wheels are rotatable relative to the rearwardly facing ledge. Each of the first 22 and second 24 wheels are substantially cylindrical in form, and are mounted such that at least a portion of the curved face of the wheels 22, 24 extends rearwardly out of the recesses formed in the rearwardly facing ledge 20. The curved faces of the wheels 22, 24 are knurled/textured to form grip portions for a user.

The third wheel 26 is substantially cylindrical in form, and the curved face of the third wheel 26 is knurled/textured. The third wheel 26 is partially embedded in the grip portion 18, such that a minor portion of the curved face of the third wheel 26 extends outwardly from the grip portion 26. The third wheel 26 is embedded such that the third wheel 26 is rotatable relative to the grip portion 18, and is also depressible relative to the grip portion 18. Either of the first and second wheels could also be depressible, e.g. in a downward direction, if desired to provide additional actuation modes.

The depressible button 28 is located on an upper surface of the first housing component 12, and is circular in form. The depressible button 28 is partially embedded into the first housing component 12 such that the depressible button 28 is depressible relative to the first housing component 12.

The first 22, second 24, and third 26 wheels, and the depressible button 28, provide inputs for control signals for communication with a portable electronic device to be held by the device in use.

The location formation 30 takes the form of a projection, pin or stud, e.g. being substantially cylindrical in form, and projects outwardly from a rear surface of the first housing component 12, as shown in FIG. 3. The location formation 30 is shaped and dimensioned to be received in a corresponding location recess 41 in the second housing component.

The strap receiving formation 32 is shown at the open end of the housing but could otherwise be provided at the opposing end of the device, e.g. at the closed/grip end of the housing and/or mobile phone enclosure. Locating the formation 32 at the open end advantageously means that the closed end is lowermost when the device 10 hangs from the strap under gravity. The strap receiving formation 32 may comprise a recess or projection through which a conventional lanyard cord can pass. In this example the formation 32 is within the housing body but could otherwise project outwardly from a side wall of the housing if desired. The strap receiving formation 32 has a through hole such that a strap may be looped about the strap receiving formation 32.

The mount receiving recess 34 is shaped and dimensioned to receive a hot shoe mount, and may be used to couple ancillary photographic components, such as one or more lenses or a light source—i.e. a flash—to the accessory 10 in use. Although not shown in FIGS. 1-3, the mount 34 may comprise an electrical connector such that an ancillary device could be powered or controlled by the accessory.

The electronics housing 36 comprises an openable enclosure which is hollow, such that appropriate electronics components, for example including a wireless signal transmitter/emitter and/or receivers, can be received within the electronics housing 36.

The second housing component 14 has a planar wall 40, a rearwardly facing ledge 42, and a side wall 44. The second housing component 14 is shaped and dimensioned to be partially received within the first 12 and third 16 housing components. The planar wall 40 comprises a location recess 41, as shown in FIG. 3. The location recess 41 is elongate in form and has curved ends, being in the form of a slot or elongate window. The width of the location recess 41 corresponds substantially to the diameter of the location formation 30, whilst the length of the location recess 41 is greater than the diameter of the location formation 30. Thus location formation 30 may move along the location recess 41, such that the first 12 and second 14 housing components are slidable relative to one another.

A spring, elastic cord or member, or other resilient member may be provided between the first 12 and second 14 housing members so as to bias those members towards each other. Such a biasing member is typically provided within the interior of the housing. Opposing ends of the resilient member are typically connected to the opposing housing portions 12 and 14.

The rearwardly facing ledge 42 extends orthogonally from a lower region of the planar wall 40, and extends by a distance such that the rearmost edge of the rearwardly facing ledge 20 of the first housing component 12 and the rearmost edge of the rearwardly facing ledge 42 of the second housing component are substantially aligned when the device 10 is assembled. The rearwardly facing ledge 42 has an upstanding retaining formation 46. The upstanding retaining formation 46 is substantially elongate in form, such that the upstanding retaining formation 46 and the planar wall 40 define a channel for receiving a portable electronic device. The upstanding formation may be defined in terms of a lip or low wall section.

The side wall 44 extends orthogonally to both the planar wall 40 and the rearwardly facing ledge 42, such that the combination of the planar wall 40, rearwardly facing ledge 42, and side wall 44 defines a corner portion of the second housing component 14.

The third housing component 16 is an insert which is shaped and dimensioned to fit onto a rear surface of the first housing component 12 and partially overlying the second 14 housing component. The third housing component 16 comprises a planar wall 48, a rearwardly facing ledge 50 and a side wall 52. The planar wall 52 has a recess which is shaped and dimensioned to receive the electronics housing 36, such that the rear wall of electronics housing 36 sits substantially flush with the planar wall 48. The planar wall 48 sits on top of the location formation 30 when the accessory 10 is assembled.

The rearwardly facing ledge 50 extends orthogonally to an upper region of the planar wall 48, and is shaped and dimensioned to fit underneath the rearwardly facing ledge 20 of the first housing component 12. The rearwardly facing ledge 50 has an upstanding retaining formation 54. The upstanding retaining formation 54 is substantially elongate in form, such that the upstanding retaining formation 54 and the planar wall 48 define a channel for receiving a portable electronic device.

The side wall 52 extends orthogonally to the planar wall 48 and the rearwardly facing ledge 50 of the third housing component 16, and orthogonally to the rearwardly facing ledge 42 of the second housing component 14.

Thus the combination of the following components defines a partial enclosure for receiving a portable electronic device in use: the planar wall 48, rearwardly facing ledge 50, upstanding retaining formation 54 and side wall 52, of the third housing component 16; and the planar wall 40, rearwardly facing ledge 42 and upstanding retaining formation 46, of the second housing component 46.

The end of the partial enclosure which is opposite to the side wall 52 of the third housing component 16 is open, such that a portable electronic device can be slid into the partial enclosure in use. The channel defined by the planar wall 48 and the upstanding retaining formation 54 of the third housing component 16 opposes the channel defined by the planar wall 40 and the upstanding retaining formation 46 of the second housing component 14, such that the sides of a portable electronic device are held by the channels.

Figure 4:
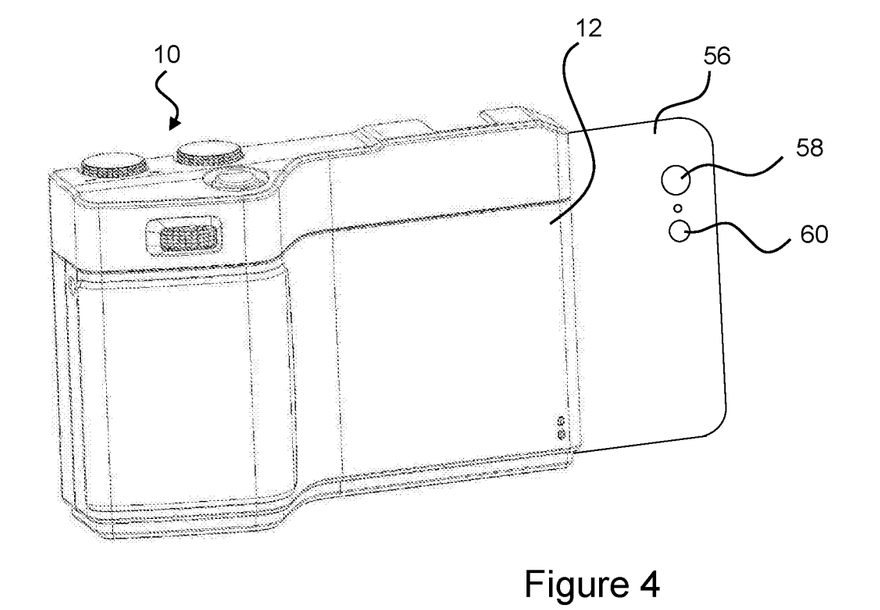
FIG. 4 is a schematic front perspective view of the housing of FIG. 1 in use with a mobile phone.
Figure 5:
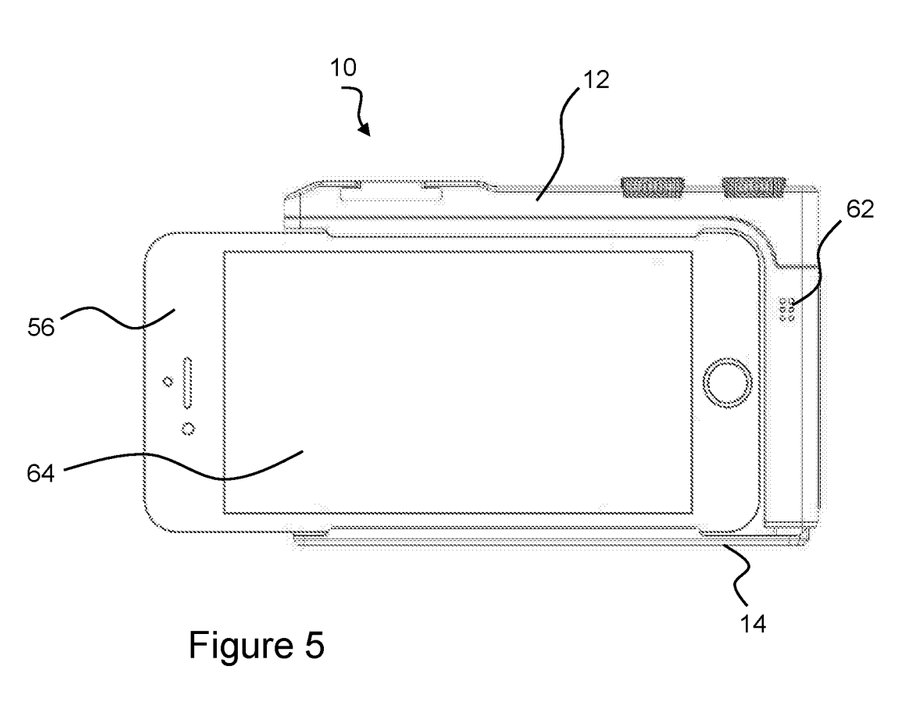
FIG. 5 is a schematic rear perspective view of the housing of FIG. 1 in use with a mobile phone.

The device 10 is shown in use with a portable electronic device 56 in FIGS. 4 and 5. The dimensions of the partial enclosure are such that a portion of the portable electronic device 56 extends outwardly from the partial enclosure, and hence the device 10, in use. In particular, the portion of the portable electronic device 56 which comprises a camera lens/module 58, and optionally flash/light 60, extends outwardly from the partial enclosure. The first 12 and second 14 housing components can be moved relative to one another to increase and/or decrease the size of the partial enclosure, via movement of the location formation 30 within the location recess 41.

The first 12 and second 14 housing portions can thus be closed manually or under resilient bias (e.g. automatically) so as to be a close fit with a device 56 inserted therein. The rear surface of the device/housing and/or any other wall or surface of the partial enclosure for the device may comprise a textured surface or friction enhancing material.

The closable nature of the housing is particularly important in allowing different phone models to be accommodated and securely held in the accessory 10. This also permits mobile phones to be accommodated in the accessory 10 without the need to remove a conventional protective case from the phone.

The accessory 10 can be designed to be universal in nature by selecting its length to be sufficiently shorter than most widely available mobile phones such that the camera lens, typically provided towards an end of the mobile phone is exposed even when the phone is fully inserted into the accessory 10. In other examples, the wall 52 could be adjustable to modify the length of the enclosure to suit a particular phone form if required.

In FIG. 5, optional openings 62 are provided in the side wall 44, e.g. in the side and rear thereof, in order to avoid blocking/muffling of the phone's own speaker and or microphone openings. Thus one or more opening 62 may be provided in the rear wall to allow passage of air to the relevant phone openings. A series of openings could be provided to accommodate a range of different phone models.

In the examples of the accessory 10 described below, the accessory comprises an acoustic emitter arranged to emit acoustic signals at varying frequencies in the upper audible or near super/ultrasonic range. This has been found to provide a well-suited, simple and responsive control signal scheme without the need to implement functions by transmitting data via radio signals. This process may avoid the need to pair devices as required by conventional radio communication technologies, such as Bluetooth®, which can be time consuming and thus problematic for a photographer.

However radio signal transmission could additionally or alternatively be provided in other examples of the invention if desired. A short range, UHF radio signal standard such as Bluetooth® or the like could be used to implement data communication between the accessory 10 and device 56 where required, e.g. for assigning functionality to individual actuators or communicating status or other information to the user. Accordingly data signals may be used for communicating certain information between the device 56 and accessory 10, particularly for bi-directional communication, whereas acoustic signals may be used for simple photographic control instructions.

It is noted that the wheels 22, 24 and 26 offer bi-directional control, thereby offering at least two modes of control input. The button offers at least two levels of depression thereby offering at least two modes of input. Accordingly the four manual actuators in combination can offer eight or more modes of input.

Each mode of input is assigned one or more acoustic signal frequency, such that when the relevant input mode is actuated by the user the emitter outputs one or more acoustic signal at the corresponding acoustic frequency. The frequencies for the different inputs are assigned with spacings there-between such that each frequency is readily discernible by a conventional microphone within the mobile phone 56. The frequency range available to each actuator or actuation mode may be banded as desired.

In some examples it may be desirous to assign two or more frequencies to each actuation mode, such that a signal emission comprises two or more frequencies (tones) in succession. The camera application on the mobile phone will thus recognise the instruction only if both signal components are received in suitably close succession. This may help avoid any likelihood for an ambient sound (rather than an emitted signal) accidently triggering the device.

In this example, a lowest frequency of between 16 and 19 kHz is selected and a highest frequency of between 19 and 21 kHz is selected and the individual selected mode frequencies can be substantially evenly spaced over the selected range. Unused frequency ranges of values may be reserved for additional functionality or ancillary devices. In other examples the range could be anywhere between 10 kHz and 30 kHz.

The used frequencies may be spaced in steps of up to, or equal to, 50 Hz, 100 Hz, 150 Hz, 200 Hz, 250 Hz or 300 Hz. An intermediate value within such a range could be selected according to the resolution of repeatable recognition that can be achieved using the portable device microphone.

A bespoke software application is installed on the device 56 in examples of the invention in order to:

(i) allow interpretation and implementation of photography control instructions received via the microphone (ii) provide an on screen user interface to allow user control of additional camera functionality or settings or image processing (iii) allow assigning of bespoke functions to each individual manual actuator or actuation mode of the accessory The mapping of functions to each actuator allows customisation of the accessory to an individual user's preferences. Camera functions, settings or parameters may be assigned. In some examples, individual camera mode options may be customised and individually assigned to an actuator/wheel. The use of an user interface on the screen of the device 56 allows further options for the split of functions provided between the accessory 10 and the device screen (e.g. those used most frequently, or for which quick access is required being assigned to the accessory actuators). It is often that on-screen touch controls are problematic for photography since it requires a user to obscure a portion of the image displayed on screen whilst selecting a function. It is also an unnatural, un-ergonomic position to grip a mobile phone by its peripheral edge whilst trying to select a function or take a photograph. This can lead to a mobile phone being dropped and typically requires a two-handed operation. In contrast the present invention permits additional (e.g. professional) photography functionality in a more ergonomic and quickly-accessible manner.

In an example of use, a user inserts the mobile phone 56 into the accessory 10 as shown in FIGS. 4 and 5. This may be done by sliding the phone longitudinally into the accessory or else by positioning the phone in the housing recess and closing the housing portions to engage the phone edges.

The photography software application running on the phone 56 listens for appropriate tones sensed at the microphone and by determining the tone/frequency of the acoustic signal determines which manual actuator has been activated and in what manner by the user.

The software application makes a corresponding adjustment to the photographic settings for taking pictures or otherwise recording images. In the event that the user adjusts a photographic mode using one wheel, the software application may adjust a number of related parameters or settings in order to implement the selected camera mode. The software application may implement changes to ISO priority, speed priority, manual adjust ISO and speed, snow mode, night mode, sports mode, landscape mode or the like.

Manual actuation of a further wheel may provide exposure compensation or dark/light image capture adjustment. For example the wheel may be turned anticlockwise to darken a picture and clockwise to lighten it or vice versa.

The display screen 64 on the mobile phone 56 may display the scene currently captured by the image sensor such that any adjustments to settings can be seen on the screen, thereby allowing a user to assess the current image and adjust accordingly.

A further wheel may be used for zoom or focus adjustment. Manual focus and/or exposure control are two particular functions that have been awkward to implement using existing touch-screen controls on mobile phones.

Once the image on screen is acceptable to the user, the shutter button 28 may be partially depressed to lock the current focus setting and/or exposure setting. Continuing to full depression of the shutter button captures the image. Once captured, the image will be displayed to the user on the phone screen, thereby allowing further editing of the image after capture, if required. In the mode when the phone is displaying an already captured image, the manual actuators may have image editing functions, which may be pre-set, e.g. akin to the corresponding functions prior to image capture, or else may be customisable by the user. In other examples, the image may be simply stored for later review/editing in order to allow further images to be captured.

The tables below show the various different functions that can be enabled in different modes of camera operation such as:

ISO priority
Image exposure speed/duration (i.e. so-called shutter speed)
Manual ability to control both of the functions above
Sports mode (maximising speed in the given conditions)
Portrait mode (slightly faster speed than normal)
Snow mode (under expose the subject by a stop)
Landscape mode (increase shutter speed and increase iso to try to eliminate camera shake)
Night mode (increase exposure so its 3 stops over exposed so the stars become visible).

The initial functionality of the wheels 22, 24 and 26 and button 28 described above may be set as follows:

Shutter button—Focus lock, exposure lock, picture take
wheel 1—exposure-dark-to-light compensation
wheel 2—Pre-set mode selector (auto sport, scene, manual, macro etc.)
wheel 3/ring—zoom
wheel 3 press—"selfie" mode or switch to reverse camera on phone In different embodiments any of the wheel functions may be adjustable by the user. It is envisaged that wheel 1 and/or 2 (i.e. wheels 22 and 24 in FIG. 1) in particular may be adaptable to allow user-defined pre-sets or user selection of specific photographic options that the user frequently uses.

In addition to the mobile devices own camera functionality, which may be accessible to the user via the photography software application described herein, any, any combination, or all of the following functions may be enabled using the invention:

Half depress shutter button for focus
Half depress shutter button for exposure lock
Full depress picture taken.
White balance auto tungsten sunny cloudy etc settings use choose and wheel
Exposure compensation to outer wheel (F stops marks)
Flash on (full power) off and auto seen to adjust.
Focus point, spot, centre weighted, average, with moveable point adjusted by screen taping.
Light too low symbol comes up at shutter speeds below 60th?
Ability to set one of the exterior buttons to any adjustable feature e.g. WB etc. via BT to our hardware
Exposure and focus lock buttons to screen.
Filters and film types various—based on smartphone's filters/off the shelf filters
Save as jpeg hi and lo and Tiff
Grid on off and various shapes rule of thirds etc

|  | move able focus and exposure lock | half depress button | White balance | Screen pintch | manual focus | low light indicator | bracketing | exposure compensation |
|---|---|---|---|---|---|---|---|---|
| Shutter priority | Y | Y | Y | Y | Y | Y | Y | Y |
| ISO priority | Y | Y | Y | Y | Y | Y | Y | Y |
| Manuale | Y | Y | Y | Y | Y | Y | Y | N |
| Sports | Y | Y | AUTO | Y | N | Y | N | Y |
| Landscape | Y | Y | AUTO | Y | N | Y | N | Y |
| Portrait | Y | Y | AUTO | Y | N | Y | N | Y |
| Snow | Y | Y | AUTO | Y | N | Y | N | Y |
| Video | Y | AUTO | AUTO | Y | N | Y | N | Y |
| Selfie | Y | Y | AUTO | Y | N | Y | N | N |
| AUTO | Y | Y | AUTO | Y | N | Y | N | N |

|  | timer | time lapse | HDR | reset | flash on/off, etc | low light | Location | Facial recognition |
|---|---|---|---|---|---|---|---|---|
| Shutter priority | Y | Y | Y | Y | Y | Y | Y | N |
| ISO priority | Y | Y | Y | Y | Y | Y | Y | N |
| Manuale | Y | Y | Y | Y | Y | Y | Y | N |
| Sports | Y | Y | N | Y | AUTO | Y | Y | N |
| Landscape | Y | Y | N | Y | AUTO | Y | Y | N |
| Portrait | Y | Y | N | Y | AUTO | Y | Y | Y |
| Snow | Y | Y | N | Y | AUTO | Y | Y | N |
| Video | N | N | N | Y | CONTINUOUS | Y | Y | N |
| Selfie | Y | N | N | Y | AUTO | Y | Y | Y |
| AUTO | Y | Y | N | Y | AUTO | Y | Y | Y |

Battery level

Location on off on wheel ability to switch to picture library.

Focus bar for manual focusing.

Zoom pinch method plus exterior wheel.

Shutter priority, iso priority, manual, auto function.

Histogram to screen on and off.

Bracketing+/−1 stop or ½ stop

In app purchases for upgrades/additional functionality

Any adjustment to any of the functions, modes and/or settings disclosed above may cause a corresponding display on the display screen 64, e.g. by way of text, icon or image adjustment.

A software application may be downloaded to the portable device 56 to allow interface between the accessory 10 and the hardware/API's of the device. The app may provide for a bespoke photography user interface on the display screen 64, e.g. providing on-screen buttons for adjustment of certain image capture functions and/or image/video editing functions.

Once images have been captured, one or more wheel may operate in an image review/editing mode, whereby different functionality is provided to the functions used during image capture. One wheel may for example be assigned to a scrolling function to allow the user to readily scan through captured images.

In a further development of the invention it is proposed to access the portable device's GPS or other location sensing system. This may be used to record the location of an image or video. Additionally or alternatively, the location may be used to modify image capture or modification settings. For example settings may be altered according to a country, region or other geographic indication. This may be used to automatically take account of visual preferences in certain countries or regions. In some western countries it is generally preferred to add a warming effect to portraits, whereas in other countries there is a general preference to brightening of subjects. This and other general trends of preference can be programmed into the software application, such that it can provide a universal photography system for different regions of the world.

The invention claimed is:

1. A photography housing for receiving a mobile phone, the housing comprising:
   first and second housing components defining at least a partial enclosure for receiving a mobile phone, the first and second housing components being movably connected to one another, such that an internal dimension of the at least a partial enclosure is alterable to releasably fit a dimension of the mobile phone inserted therein,
   wherein the photography housing comprises a user input device for controlling the operation of an image sensor of a mobile phone received within the at least a partial enclosure during use of the photography housing,
   the first and second housing components being biased towards each other so as to resiliently hold the mobile phone there-between in use, and
   the at least a partial enclosure having an open side such that at least a portion of a mobile phone may protrude beyond the at least a partial enclosure in use through said open side.

2. A housing as claimed in claim 1, wherein the first and second housing components are slidably connected to one another and are adjustable so as to grip opposing lateral edges of the portable electronic device.

3. A housing as claimed in claim 1, wherein at least a portion of the first housing component is receivable within the second housing component, or vice versa.

4. A housing as claimed in claim 1, wherein the first and second housing components comprise retaining formations in the form of opposingly facing channels on the first and second housing components for retaining a portable electronic device within the at least partial enclosure.

5. A housing as claimed in claim 1, wherein the first and/or second housing components are shaped to define a grip portion for holding the housing, wherein the grip portion is formed on a surface of the housing that faces away from a user and/or the portable electronic device, said grip portion comprising a protuberance or portion of the housing having increased depth.

6. A housing as claimed in claim 1, wherein the housing comprises at least one manual actuator for activating photography functions of the portable electronic device, and/or for altering photography settings of the portable electronic device, in use.

7. A housing as claimed in claim 6, wherein the at least one manual actuator comprises a plurality of wheels and a shutter control actuator for operation of the image sensor, at least one wheel being turnable by a user to select photography settings.

8. A housing as claimed in claim 6, wherein the at least one manual actuator is configured to alter any or any combination of the following settings of a photography software application of a portable electronic device: white balance; zoom; light sensitivity of the image sensor; duration of image capture; photography mode selection; manual focus; bracketing; exposure compensation; time lapse/delay; high definition resolution (HDR); flash; low light; and/or facial recognition.

9. A housing as claimed in claim 6, wherein the at least one manual actuator is configured to alter a collection of image capture settings of the portable electronic device concurrently, so as to switch between photography modes.

10. A housing as claimed in claim 1, wherein the housing comprises a mount for removably mounting ancillary camera components to the housing, such as a support arm, leg and/or at least one lens.

11. A photographic equipment system comprising a housing according to claim 1 and a mobile phone having an image sensor, a controller and a control signal receiver, wherein the housing comprises an output circuit arranged to output a control signal to said receiver for controlling operation of image capture by the image sensor; and wherein the mobile phone comprises machine readable instructions for operation of the controller to implement a plurality of image capture control parameters in response to the control signal output by the output circuit.

12. A photographic equipment system according to claim 11, wherein the manual actuator is selectively assignable to one or more of said plurality of image capture control parameters by an end user and the controller runs a software application to generate a user interface on a screen of the portable electronic device to allow mapping of one or more actuation mode of the manual actuator to one or more image capture control parameter.

13. A photographic equipment system according to claim 11, wherein the machine readable instructions provide user control for multiple photography controls, at least some of said controls being controllable via the manual actuator(s) of the housing and at least some other of said controls being controllable via a user interface of the portable electronic device.

14. An accessory for a portable electronic device, the portable electronic device having a microphone, an image sensor and a controller, wherein the accessory comprises a removable housing for the portable electronic device having a manual actuator and an acoustic signal emitter arranged to output an acoustic signal for interpretation by the controller via the microphone in response to user actuation of the manual actuator, the controller operating the portable electronic device in response to interpretation of the acoustic signal.

15. An accessory according to claim 14, wherein the acoustic signals are in the far audible, supersonic, ultrasonic and/or near ultrasonic/supersonic spectrum and/or the acoustic signals have a frequency of greater than 10, 15, 16 or 17 kHz.

16. An accessory according to claim 14, wherein each signal comprises a plurality of tones, the controller recognising the plurality of tones as an instruction for operation of the portable electronic device.

17. A housing as claimed in claim 1, wherein the photography housing comprises a spring to provide the biasing force, and/or wherein the biasing mechanism is used with a latch holding the first and second housing components in a selected relative position.

\* \* \* \* \*